No. 753,359. PATENTED MAR. 1, 1904.
J. CASEY.
ANTIKICKER FOR COWS.
APPLICATION FILED JULY 31, 1903.
NO MODEL.

Witnesses
N. S. Kilgore
A. H. Opsahl

Inventor
John Casey.
By his Attorneys
Williamson & Merchant

THE NORRIS PETERS CO., PHOTO-LITHO., WASHINGTON, D. C.

No. 753,359. Patented March 1, 1904.

UNITED STATES PATENT OFFICE.

JOHN CASEY, OF CASEY, MINNESOTA.

ANTIKICKER FOR COWS.

SPECIFICATION forming part of Letters Patent No. 753,359, dated March 1, 1904.

Application filed July 31, 1903. Serial No. 167,677. (No model.)

*To all whom it may concern:*

Be it known that I, JOHN CASEY, a citizen of the United States, residing at Casey, in the county of Meeker and State of Minnesota, have invented certain new and useful Improvements in Antikickers for Cows; and I do hereby declare the following to be a full, clear, and exact description of the invention, such as will enable others skilled in the art to which it appertains to make and use the same.

My invention has for its object to provide a simple and efficient device for preventing cows from kicking while being milked, and such a device I term for brevity an "antikicker."

To the ends above indicated, the invention consists of the novel devices and combinations of devices hereinafter described, and defined in the claim.

The device is illustrated in the accompanying drawings, wherein like characters indicate like parts throughout both views.

Figure 1:
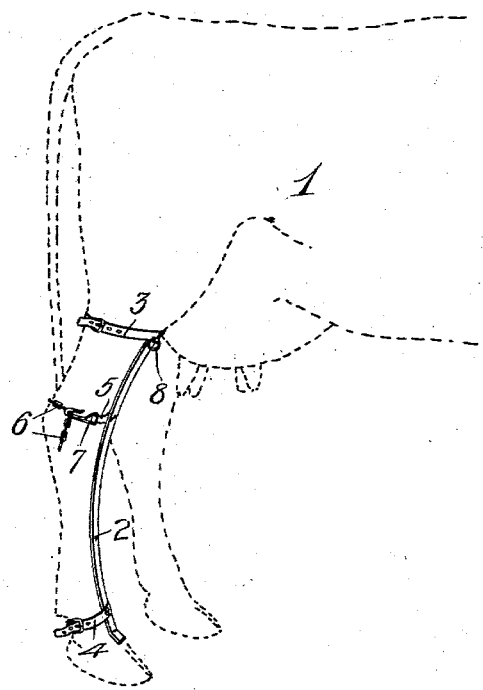
Figure 2:
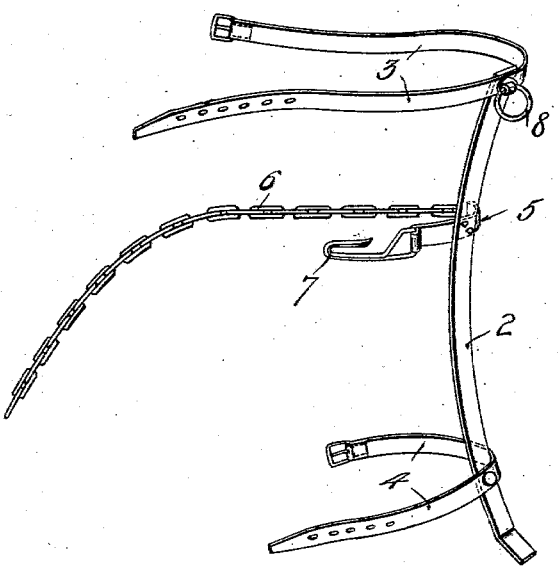

Figure 1 is a perspective view showing the device in operative position on the rear leg of a cow, the cow being indicated in part by dotted lines; and Fig. 2 is a perspective view, on an enlarged scale, showing the device removed from working position.

The cow so far as illustrated is indicated by dotted lines, (designated by the numeral 1.)

The improved device involves a stiff curved metal bar 2, which is adapted to fit approximately the curve of the front portion of the rear leg of the cow, so that the same may be applied thereto, as shown in Fig. 1. At its upper end the bar 2 has attached to it a buckle-equipped strap 3, and near to but above its lower extremity it has attached to it a similar but shorter strap 4. At its intermediate portion, but nearer its upper end than its lower end, a metallic bow or curved strap 5 is attached to said bar 2. To one end of the bow 5 one end of a chain 6 is attached and to the other end thereof is pivotally attached a chain grappling-hook 7. As shown, there is a ring 8 also attached to the upper end of the bar 2. This ring simply serves as a convenient means by which to lift the device.

When the device is applied as shown in Fig. 1, the strap 3 is buckled around the shank of the leg, the strap 4 is buckled around the leg just above the hoof, and the chain 6 is placed around the leg just above the hock-joint and after being drawn reasonably taut is secured to the hook 7, all as clearly shown in said Fig. 1.

It is very evident that when the device is applied as shown in the drawings the cow's leg will be held stiff, and it is a well-known fact that cows cannot kick without bending the leg at the hock-joint.

The device is of small cost, may be quickly applied in working position or removed therefrom, and, while it will effectually prevent a cow from kicking, will not injure the leg. The curved bar being firmly held against the curved forward portion of the leg will not chafe the leg and affords a rigid support against which the leg may be drawn. The device is of course capable of modification within the scope of the invention herein set forth and claimed.

What I claim, and desire to secure by Letters Patent of the United States, is as follows:

An antikicker for cows, comprising the stiff curved bar 2 having at its upper and lower portions, respectively, the straps 3 and 4, the bow 5 secured to the intermediate portion of said bar 2, the chain 6 attached to one end of said bow 5, and the chain grappling-hook 7 at the other end of said bow 5, said parts operating to secure said bar to the animal's leg, substantially as described.

In testimony whereof I affix my signature in presence of two witnesses.

JOHN CASEY.

Witnesses:
 JOHN T. BYRNES,
 PATRICK CASEY.